US010332078B2

(12) United States Patent
Mori et al.

(10) Patent No.: US 10,332,078 B2
(45) Date of Patent: Jun. 25, 2019

(54) ELECTRONIC RECEIPT ISSUING SYSTEM

(71) Applicant: Star Micronics Co., Ltd., Shizuoka-shi, Shizuoka (JP)

(72) Inventors: Yuji Mori, Shizuoka (JP); Katsuya Ideno, Shizuoka (JP); David Salisbury, Shizuoka (JP)

(73) Assignee: STAR MICRONICS CO., LTD., Shizuoka-shi (JP)

( * ) Notice: Subject to any disclaimer, the term of this patent is extended or adjusted under 35 U.S.C. 154(b) by 584 days.

(21) Appl. No.: 14/591,281

(22) Filed: Jan. 7, 2015

(65) Prior Publication Data
US 2016/0196538 A1    Jul. 7, 2016

(51) Int. Cl.
*G06Q 20/04*    (2012.01)
*G06F 3/12*    (2006.01)
(Continued)

(52) U.S. Cl.
CPC ....... *G06Q 20/0453* (2013.01); *G06F 3/1204* (2013.01); *G06Q 20/20* (2013.01); *G06Q 20/209* (2013.01); *G06Q 20/32* (2013.01)

(58) Field of Classification Search
CPC .. G06Q 20/0453; G06Q 20/209; G06Q 20/20; G06Q 20/32
(Continued)

(56) References Cited

U.S. PATENT DOCUMENTS

| 8,175,923 B2 * | 5/2012 | Gerken, III | A47F 9/047 235/383 |
| 8,543,461 B2 * | 9/2013 | Mutha | G06Q 20/40 235/380 |

(Continued)

FOREIGN PATENT DOCUMENTS

| EP | 1271437 A2 | 1/2003 |
| EP | 2713265 A2 | 4/2014 |

(Continued)

OTHER PUBLICATIONS

Extended European Search Report dated Apr. 15, 2016 in EP Appln. No. 15193786.9.

*Primary Examiner* — Vanel Frenel
(74) *Attorney, Agent, or Firm* — Polsinelli PC

(57) ABSTRACT

To enable issuance of an electronic receipt without previously registering personal information and carrying out a special operation in execution of a payment by a customer. There are provided a receipt data transmitting unit 12 for transmitting receipt data, a payment terminal ID and payment date and time information to a server 300 when a payment for a sales transaction is performed in a payment terminal 100, a payment terminal ID acquiring unit 21 of a customer terminal 200 for acquiring a payment terminal ID after completing the payment, a receipt issuance requesting unit 22 for transmitting, to the server 300, a receipt issuing request including a payment terminal ID and ID acquisition date and time information, and a receipt data extracting units 33 for extracting, from among the receipt data storing unit 35, receipt data whose payment terminal ID is coincident with the payment terminal ID in the receipt issuing request and whose payment terminal ID is acquired within a predetermined time from the completion of the payment, making possible to specify receipt data for a customer without using personal information.

10 Claims, 13 Drawing Sheets

(51) Int. Cl.
*G06Q 20/20* (2012.01)
*G06Q 20/32* (2012.01)

(58) Field of Classification Search
USPC ........ 705/16, 17, 21, 26.8, 71, 44; 358/1.13; 235/380
See application file for complete search history.

(56) References Cited

U.S. PATENT DOCUMENTS

| | | | | |
|---|---|---|---|---|
| 8,738,454 | B2* | 5/2014 | Argue | G06Q 20/0453 705/16 |
| 8,892,462 | B1* | 11/2014 | Borovsky | G06Q 20/204 705/17 |
| 2003/0004811 | A1* | 1/2003 | Omori | G06Q 20/0453 705/17 |
| 2011/0191252 | A1* | 8/2011 | Dai | G06Q 20/10 705/71 |
| 2011/0231272 | A1* | 9/2011 | Englund | G06Q 20/20 705/21 |
| 2012/0203644 | A1* | 8/2012 | Phillips | G06Q 30/04 705/17 |
| 2012/0290420 | A1* | 11/2012 | Close | G06Q 20/20 705/17 |
| 2013/0080289 | A1* | 3/2013 | Roy | G06Q 10/10 705/26.8 |
| 2013/0138571 | A1* | 5/2013 | Vassilev | G06Q 20/3829 705/71 |
| 2013/0151344 | A1* | 6/2013 | Tavares | G06Q 30/00 705/14.65 |
| 2013/0173403 | A1* | 7/2013 | Grigg | G06Q 20/20 705/16 |
| 2013/0226720 | A1* | 8/2013 | Ahluwalia | G06Q 20/20 705/18 |
| 2014/0092415 | A1* | 4/2014 | Yokoyama | G06F 3/1298 358/1.13 |

FOREIGN PATENT DOCUMENTS

| | | |
|---|---|---|
| JP | 2006-243822 A | 9/2006 |
| JP | 2006-244197 A | 9/2006 |
| JP | 2011-090375 A | 5/2011 |
| WO | WO-2014/083792 A1 | 6/2014 |

\* cited by examiner

Fig. 3

| Payment terminal ID | Payment date and time information | Receipt data |
|---|---|---|
| ID-1 | 2014/12/14 10:00 | A |
| ID-2 | 2014/12/14 10:04 | X |
| ID-1 | 2014/12/14 10:05 | B |
| ID-1 | 2014/12/14 10:09 | C |
| ID-2 | 2014/12/14 10:10 | Y |
| ⋮ | ⋮ | ⋮ |

Fig. 4
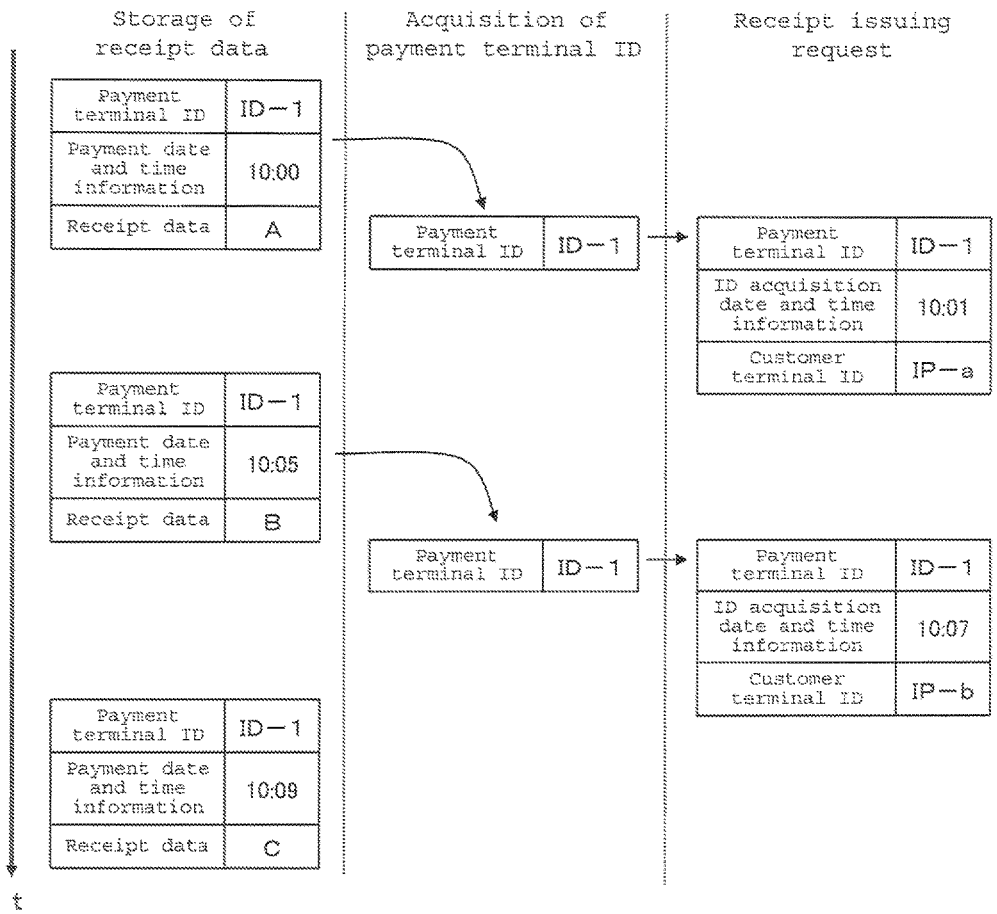
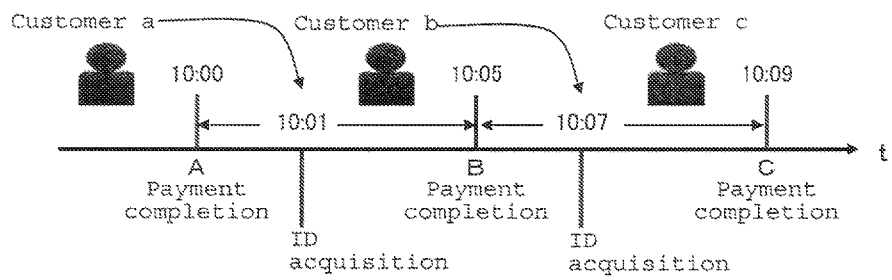

Fig. 5
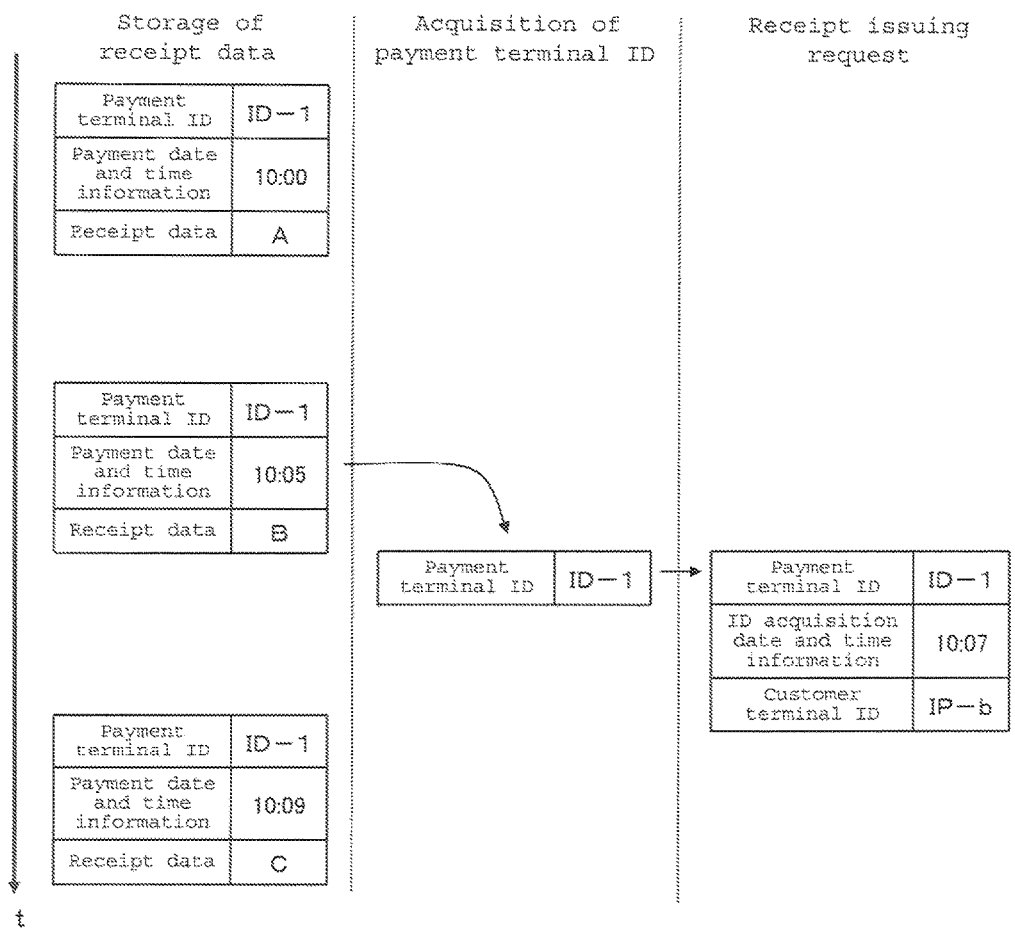
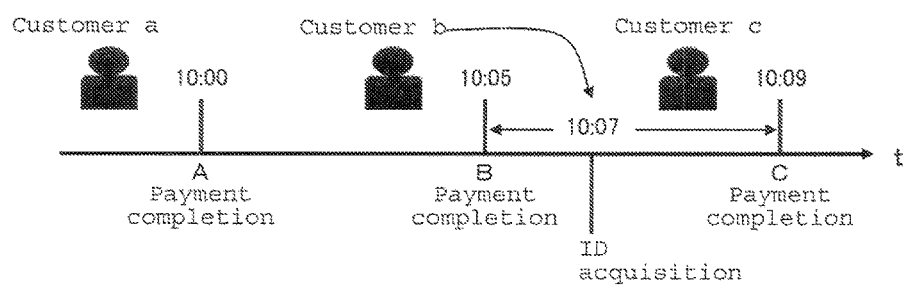

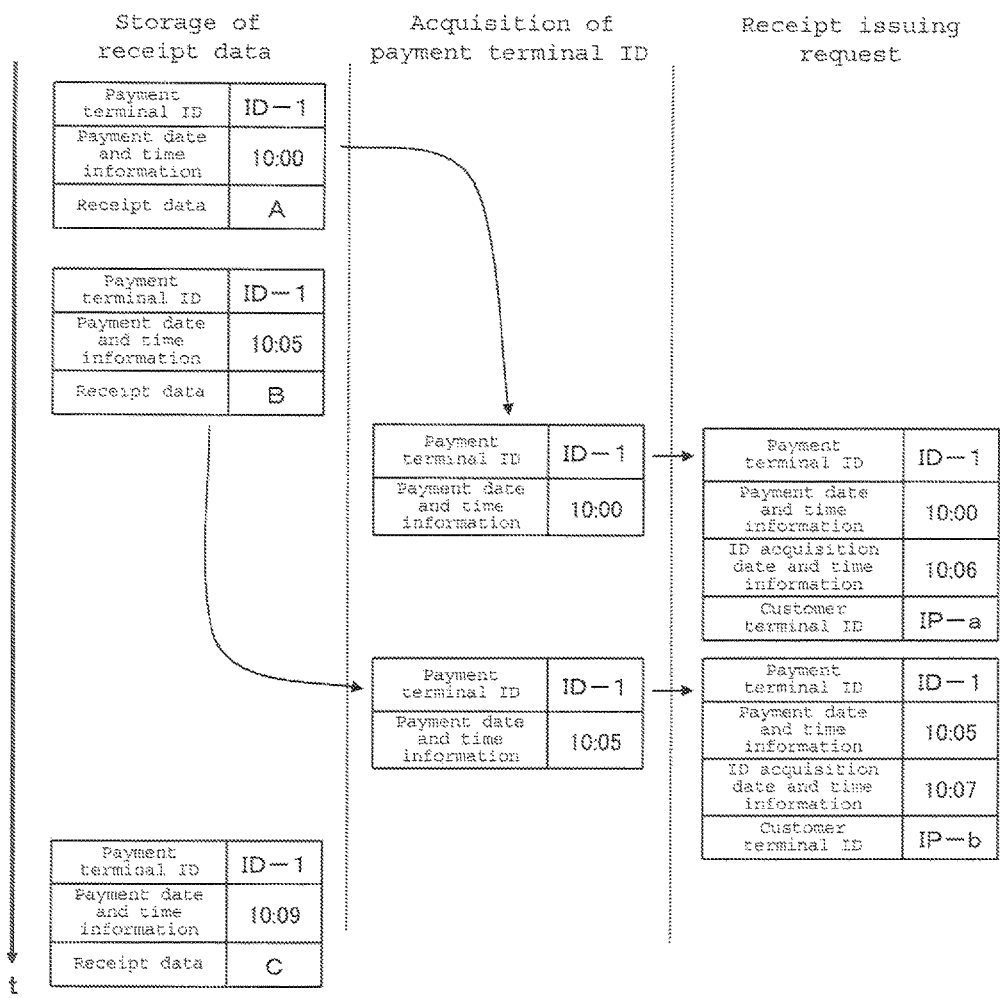
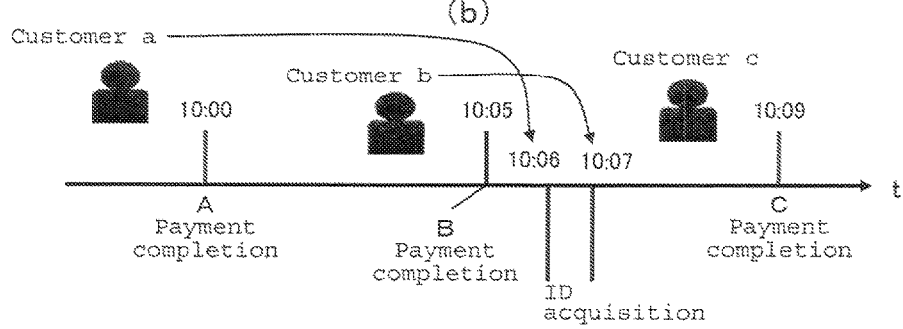
Fig. 8

ELECTRONIC RECEIPT ISSUING SYSTEM

TECHNICAL FIELD

The present invention relates to an electronic receipt issuing system and more particularly to a system to be used suitably for uploading, to a server, receipt data generated by a payment terminal at the time of payment for a sales transaction and downloading the uploaded receipt data in response to a request from a customer terminal.

BACKGROUND ART

Conventionally, there is known a system in which a receipt to be issued at the time of payment for a sales transaction made by using a POS (Point Of Sale) terminal is provided in the form of electronic information (for example, see Patent Documents 1 to 3).

In the electronic receipt system described in Patent Document 1, the POS terminal acquires identification information (a customer ID allocated uniquely to each customer or the like) from a portable terminal of a customer before completion of a transaction and notifies a tabulation server of transaction information including transaction contents and the identification information. The tabulation server stores customer master data storing set information for each customer and sales master data sequentially storing transaction information given from the POS terminal and adds up the sales based on the transaction information stored sequentially in the sales master data. A customer ID, distribution destination information (for example, a mail address etc.) indicative of a distribution destination of data to be distributed to a customer or the like is preset to the set information for each customer which is stored in the customer master data. The tabulation server adds up transaction details for each customer based on the identification information included in the transaction information and distributes the added transaction details to the distribution destination of the customer.

Referring to a product sales data processing device described in Patent Document 2, a receipt including a two-dimensional code is printed when a sales transaction is made by using a POS terminal. The two-dimensional code includes receipt data representing various information related to a sales transaction and a URL for giving access to a receipt managing web server. When a shopper receiving the receipt reads the two-dimensional code printed on the receipt by using a scanner function of a mobile phone, a connection request command is transmitted to the receipt managing web server based on the URL included in the two-dimensional code. The connection request command includes peculiar information of the mobile phone.

Upon receipt of the connection request command from the mobile phone, the receipt managing web server determines whether the peculiar information of the mobile phone included in the command is registered in a user file. The user file registers user information such as a mobile phone number or a transfer destination mail address for each user. The transfer destination mail address is a mail address of a user terminal designated by the user as the destination of a receipt information. In the case in which the peculiar information of the mobile phone included in the connection request command is registered in the user file, receipt data included in the two-dimensional code is transmitted from the mobile phone to the receipt managing web server, and furthermore, receipt data is transmitted to the user terminal based on the transfer destination mail address registered in the user file.

Referring to the POS data distribution system described in Patent Document 3, when a customer purchases a product, a register terminal receives a personal ID (a phone number or a production number of a mobile phone, information set on a customer side or the like) from the mobile phone, associates POS data of a purchased product with the personal ID, and transmits them to a POS managing server and stores them therein. A printer unit prints a URL and a personal ID of a server on a receipt to be handed to the customer. The customer performs connection to the POS data managing server by means of a mobile phone or a personal computer based on the URL and receives the POS data corresponding to the personal ID.

PRIOR ART DOCUMENT

Patent Document

[PATENT DOCUMENT 1] Japanese Laid-Open Patent Publication No. 2011-90375
[PATENT DOCUMENT 2] Japanese Laid-Open Patent Publication No. 2006-243822
[PATENT DOCUMENT 3] Japanese Laid-Open Patent Publication No. 2006-244197

SUMMARY OF THE INVENTION

Problems to be Solved by the Invention

Referring to the systems described in the Patent Documents 1 and 2, it is necessary to previously register personal information of a user in a server. In other words, in the case of the Patent Document 1, setting information such as a customer ID or a mail address has to be previously registered in the customer master data of the tabulation server. In the case of the Patent Document 2, moreover, user information such as a mobile phone number or a transfer destination mail address has to be previously registered in the user file of the receipt managing web server. For this reason, referring to the systems described in the Patent Documents 1 and 2, there is a problem in that the customer's trust might be obtained with difficulty from a viewpoint of privacy protection. In the case of a customer whose personal information is not previously registered, moreover, there is also a problem in that an electronic receipt service is unavailable On the other hand, referring to the system described in the Patent Document 3, an electronic receipt service is available even if personal information is not previously registered. It is necessary to transmit a personal ID from a mobile phone to a register terminal. By using, as a personal ID, a production number of a mobile phone, information set on a customer side or the like, however, the customer does not need to disclose personal information related to privacy. According to the system described in the Patent Document 3, moreover, the electronic receipt service is available to a customer who is not previously registered.

Referring to the system described in the Patent Document 3, however, it is necessary to transmit a personal ID from the mobile phone of the customer to the register terminal when the customer makes a payment for shopping in the register terminal. For this reason, there is a problem in that a long time is taken for a payment per customer corresponding to an execution of an operation for transmitting a personal ID. In the case in which a plurality of customers lines up at a single register terminal so as to wait for his/her turn, there is a problem in that a long waiting time is required for the customers making the line. This problem is also caused in the system described in the Patent Document 1.

In order to solve the problems, it is an object of the present invention to enable an electronic receipt to be issued to a customer without previously registering personal information of a customer in a server and carrying out a special operation when making a payment for a sales transaction by the customer at a register terminal.

Means for Solving the Problem

In order to attain the object, in the present invention, when a payment for a sales transaction is made in a payment terminal, the payment terminal transmits, to a server, receipt data representing a content of the sales transaction, the payment terminal ID capable of specifying the payment terminal in which the payment is made, and payment date and time information representing the date and time that the payment is made. The server stores them in a receipt data storing unit. On the other hand, after the payment for the sales transaction is completed in the payment terminal, a customer terminal acquires the payment terminal ID and transmits, to the server, a receipt issuing request including the acquired payment terminal ID and ID acquisition date and time information. Upon receipt of the receipt issuing request, the server extracts, from among the receipt data stored in the receipt data storing unit, receipt data whose payment terminal ID is coincident with the payment terminal ID included in the receipt issuing request and whose payment terminal ID is determined to be acquired by the customer terminal within a predetermined time from the completion of payment based on the ID acquisition date and time information, and issues the electronic receipt based on the extracted receipt data.

Effect of the Invention

According to the present invention described above, at the time of payment for a sales transaction in a payment terminal, the receipt data for each customer is specified from among the receipt data transmitted from the payment terminal and registered in the server based on the payment terminal ID, the payment date and time information and the ID acquisition date and time information, and an electronic receipt is issued to the customer. In other words, if it is determined by the payment date and time information and the ID acquisition date and time information that the payment terminal ID is acquired by the customer terminal within a predetermined time from the completion of payment for a sales transaction for a certain customer, the receipt data relevant to the payment made on the date and time indicated by the payment date and time information can be specified as the receipt data for the customer acquiring the payment terminal ID within the predetermined time, and the receipt data is issued to the customer in the form of the electronic receipt. Here, neither the payment terminal ID, the payment date and time information nor the ID acquisition date and time information used to specify the receipt data for each customer are personal information of the customer. Even if the personal information of the customer is not previously registered, accordingly, it is possible to issue the electronic receipt to the customer.

According to the present invention, moreover, it is not necessary to acquire the payment terminal ID in the customer terminal before or during the execution of the payment for the sales transaction in the payment terminal. In other words, it is only necessary to acquire the payment terminal ID within a predetermined time after the payment for the sales transaction is completed in the payment terminal. Therefore, it is possible to issue the electronic receipt to the customer without executing a special operation when the customer makes the payment for the sales transaction in the register terminal.

BRIEF DESCRIPTION OF THE DRAWINGS

FIG. 3 is a diagram typically showing an example of data to be stored in a receipt data storing unit according to the present embodiment.

FIG. 4 is a typical diagram showing an example of an issuing request operation for an electronic receipt according to the first embodiment.

FIG. 5 is a typical diagram showing another example of the issuing request operation for the electronic receipt according to the first embodiment.

FIG. 8 is a typical diagram showing an example of an issuing request operation for an electronic receipt according to the second embodiment.

BEST MODE FOR CARRYING OUT THE INVENTION (First Embodiment)

Figure 1:
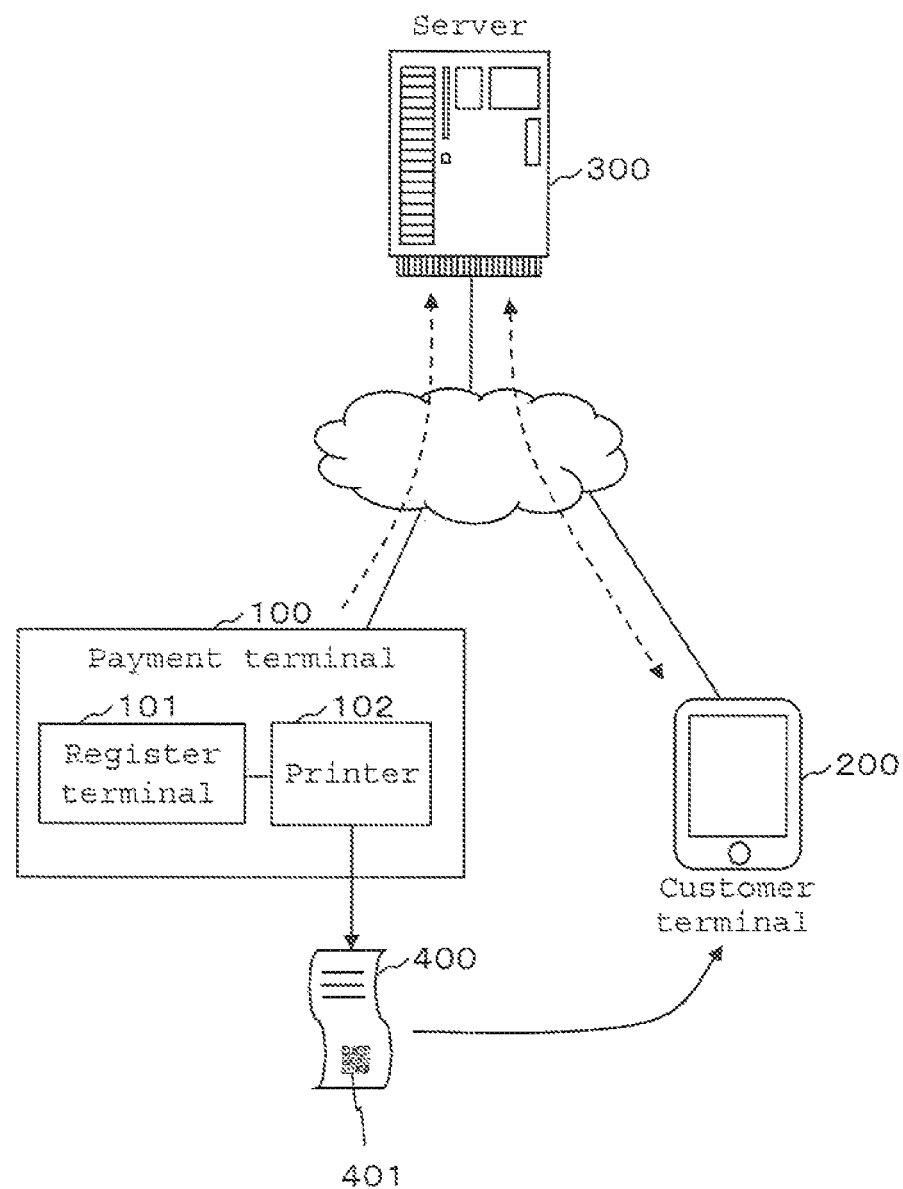
FIG. 1 is a block diagram showing an example of a whole structure of an electronic receipt issuing system according to a first embodiment.

A first embodiment according to the present invention will be described below with reference to the drawings. FIG. 1 is a block diagram showing an example of a whole structure of an electronic receipt issuing system according to the first embodiment. As shown in FIG. 1, an electronic receipt issuing system according to the first embodiment is provided with a payment terminal 100, a customer terminal 200 and a server 300. The payment terminal 100 is configured from a register terminal 101 and a printer 102 connected thereto.

Although there is shown an example in which the printer 102 is connected as an external device of the register terminal 101, it is also possible to employ a structure in which the register terminal 101 includes the printer 102.

The customer terminal 200 is configured from a smart phone, a tablet terminal, a mobile phone or the like, for example. The customer terminal 200 includes a camera (not shown) and has a function for photographing and reading a two-dimensional code 401 on a receipt 400 printed by the printer 102 and decoding contents of information which are coded as the two-dimensional code 401.

The register terminal 101 and the server 300 are connected to each other through internet, for example. Moreover, the customer terminal 200 and the server 300 are connected to each other through the internet, for example. In the electronic receipt issuing system according to the first embodiment, receipt data generated at the time of payment for a sales transaction in the payment terminal 100 is uploaded and stored in the server 300 and the uploaded receipt data is downloaded in response to a request given from the customer terminal 200. Thus, an electronic receipt can be issued to a customer.

The server 300 can be configured separately by a storage server for accumulating the receipt data uploaded from the payment terminal 100 and an application server for downloading the relevant receipt data (issuing the electronic receipt) upon receipt of a receipt issuing request from the customer terminal 200. For convenience of simplification of explanation, however, the server 300 will be described as a whole.

Figure 2:
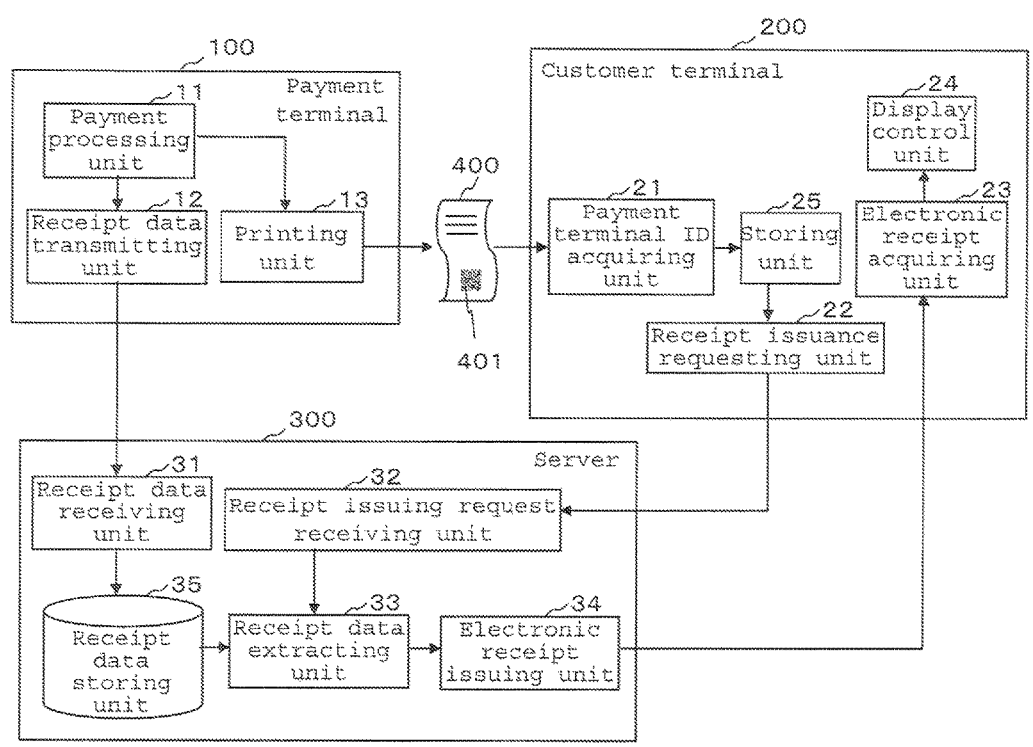
FIG. 2 is a block diagram showing an example of functional structures of a payment terminal, a customer terminal and a server according to the first embodiment.

FIG. 2 is a block diagram showing an example of functional structures of the payment terminal 100, the customer terminal 200 and the server 300 according to the first embodiment. As shown in FIG. 2, the payment terminal 100 according to the first embodiment includes a payment processing unit 11, a receipt data transmitting unit 12 and a printing unit 13. The payment processing unit 11 and the receipt data transmitting unit 12 have functional structures provided by the register terminal 101. The printing unit 13 has a functional structure provided by the printer 102.

The respective functional blocks 11 to 13 can be configured from any of hardware, a DSP (Digital Signal Processor) and software. For example, in the case in which the functional blocks 11 to 13 are configured from the software, they are actually configured from a CPU, an RAM, an ROM and the like of a computer and are implemented by an operation of a program stored in a recording medium such as an RAM, an ROM, a hard disk or a semiconductor memory.

The customer terminal 200 according to the first embodiment includes a payment terminal ID acquiring unit 21, a receipt issuance requesting unit 22, an electronic receipt acquiring unit 23, a display control unit 24 and a storing unit 25. These functional blocks 21 to 24 can be configured from any hardware, a DSP and software. For example, in the case in which the functional blocks 21 to 24 are configured from the software, they are actually configured from a CPU, an RAM, an ROM and the like of a computer and are implemented by an operation of a program stored in a recording medium such as an RAM, an ROM, a hard disk or a semiconductor memory.

The server 300 according to the first embodiment includes a receipt data receiving unit 31, a receipt issuing request receiving unit 32, a receipt data extracting unit 33, an electronic receipt issuing unit 34 and a receipt data storing unit 35. These functional blocks 31 to 34 can be configured from any of hardware, a DSP and software. For example, in the case in which the functional blocks 31 to 34 are configured from the software, they are actually configured from a CPU, an RAM, an ROM and the like of a computer and are implemented by an operation of a program stored in a recording medium such as an RAM, an ROM, a hard disk or a semiconductor memory.

The payment processing unit 11 of the payment terminal 100 executes a payment for a sales transaction related to purchase and sale when a customer purchases a product. The payment processing is generally performed in the register terminal 101.

When the payment for the sales transaction is made by the payment processing unit 11, the receipt data transmitting unit 12 transmits, to the server 300, receipt data representing the contents of the sales transaction, a payment terminal ID capable of specifying the payment terminal 100 in which the payment is made, and payment date and time information representing a date and time that the payment is made. Herein, the receipt data includes detailed information such as a name and a price of a product purchased and sold in the sales transaction, a total purchase amount, a deposit amount, a change amount, the date and time that the payment for the sales transaction is made and a name of a selling store. In the present embodiment, as an example, the receipt data is configured as image data including the aforementioned detailed information.

The payment terminal ID is a peculiar ID which is previously given to the payment terminal 100 and an ID of the register terminal 101 or an ID of the printer 102 (corresponding to a printer ID in the claims) may be used. As an ID, it is possible to use a serial number or the like which is given by a manufacturer of the register terminal 101 or the printer 102 or to use an MAC address. In addition, any information capable of uniquely specifying the payment terminal 100 may be used. Moreover, the payment date and time information can be specified by a timing function possessed by the register terminal 101.

When the payment for the sales transaction is completed by the payment processing unit 11, the printing portion 13 prints the detailed information related to the sales transaction on the receipt 400 which is a paper receipt. At this time, the printing unit 13 also prints, on the receipt 400, code information obtained by coding the payment terminal ID (for example, a two-dimensional code, a bar code or the like). Description will be given on the assumption that the two-dimensional code 401 is used. Although it is assumed that the detailed information and the two-dimensional code 401 are printed on the receipt 400, the detailed information can be received in the form of an electronic receipt. Therefore, only the two-dimensional code 401 may be printed.

The receipt data receiving unit 31 of the server 300 receives the receipt data, the payment terminal ID and the payment date and time information which are transmitted from the receipt data transmitting unit 12 of the payment terminal 100 and associates them with each other, and stores them in the receipt data storing unit 35. FIG. 3 is a diagram typically showing an example of data to be stored in the receipt data storing unit 35. As shown in FIG. 3, the receipt data storing unit 35 stores a set of the payment terminal ID, the payment date and time information and the receipt data for each sales transaction.

In the example of FIG. 3, two types of payment terminal IDs (ID-1, ID2) are stored. This means that data transmitted from two payment terminals 100 are stored in the receipt data storing unit 35. In the example of FIG. 3, moreover, data are sequentially stored in the receipt data storing unit 35 in ascending order of the payment date and time information (that is, order of arrival of data at the server 300).

After the payment for the sales transaction is completed in the payment terminal 100, the payment terminal ID acquiring unit 21 of the customer terminal 200 acquires the payment terminal ID. More specifically, the payment terminal ID acquiring unit 21 reads the two-dimensional code 401 on the receipt 400 printed by the printing unit 13 through photographing using the camera of the customer terminal 200, thereby acquiring the payment terminal ID encoded into the two-dimensional code 401. The payment terminal ID thus acquired is stored in the storing unit 25 in association with the ID acquisition date and time information representing an acquisition date and time of the payment terminal ID. Herein, the ID acquisition date and time information can be specified by the timing function possessed by the customer terminal 200.

The receipt issuance requesting unit 22 transmits, to the server 300, a receipt issuing request including the payment terminal ID acquired by the payment terminal ID acquiring unit 21 and temporarily stored in the storing unit 25, the ID acquisition date and time information stored in association with the payment terminal ID, and a customer terminal ID (for example, an IP address or the like) capable of specifying an address of the customer terminal 200. In the first embodiment, the receipt issuance requesting unit 22 transmits, to the server 300, the receipt issuing request including the payment terminal ID, the ID acquisition date and time information and the customer terminal ID when the payment terminal ID acquiring unit acquires the payment terminal ID (that is, when the two-dimensional code 401 of the receipt 400 is read).

The receipt issuance requesting unit 22 prestores address information (URL) of the server 300 and automatically transmits the receipt issuing request to the server 300 in accordance with the stored address information. The address information of the server 300 may be encoded together with the payment terminal ID in the two-dimensional code 401 to be printed on the receipt 400. In this case, the payment terminal ID acquiring unit 21 reads the two-dimensional code 401 by means of the camera, thereby enabling acquisition of the address information of the server 300 together with the payment terminal ID.

The receipt issuing request receiving unit 32 of the server 300 receives the receipt issuing request transmitted by the receipt issuance requesting unit 22 of the customer terminal 200. Upon receipt of the receipt issuing request, the receipt data extracting unit 33 extracts receipt data relevant to the customer requesting a receipt from among the receipt data stored in the receipt data storing unit 35.

More specifically, the receipt data extracting unit 33 extracts receipt data whose payment terminal ID is coincident with the payment terminal ID included in the receipt issuing request and whose payment terminal ID is determined to be acquired within a predetermined time from the completion of payment based on the ID acquisition date and time information included in the receipt issuing request and the payment date and time information stored in the receipt data storing unit 35. Herein, the predetermined time may be a time between the completion of the payment and the completion of the subsequent payment.

In other words, the receipt data extracting unit 33 first extracts receipt data whose payment terminal ID stored in the receipt data storing unit 35 is coincident with the payment terminal ID included in the receipt issuing request. Furthermore, from among the extracted receipt data having the coincident payment terminal ID, the receipt data extracting unit 33 extracts receipt data whose date and time represented by the payment date and time information is just before the date and time (which will be hereinafter referred to as an ID acquisition date and time) represented by the ID acquisition date and time information included in the receipt issuing request.

The receipt data to be extracted in this case is receipt data whose payment is made earlier than the ID acquisition date and time where the ID acquisition date and time is later than the payment date and time (hereinafter referred to as a receipt requesting customer payment date and time) registered in the server 300, which represents the payment date and time information transmitted from the payment terminal 100 at the time of payment for a sales transaction for a customer transmitting a receipt issuing request, and earlier than the subsequent payment date and time (hereinafter referred to as a subsequent customer payment date and time) registered in the server 300, which represents the payment date and time information transmitted from the payment terminal 100 at the time of payment for a sales transaction for a subsequent customer. In other words, the receipt data to be extracted is the receipt data corresponding to the receipt requesting customer payment date and time.

The electronic receipt issuing unit 34 issues an electronic receipt based on the receipt data extracted by the receipt data extracting unit 33. In other words, the electronic receipt issuing unit 34 transmits the electronic receipt to the customer terminal 200. In the present embodiment, the electronic receipt issuing unit 34 issues an electronic receipt to the customer terminal 200 transmitting the receipt issuing request based on the IP address included as the customer terminal ID in the receipt issuing request transmitted from the customer terminal 200. As described above, the receipt data are configured as image data including the detailed information. Accordingly, the receipt data itself can be issued as the electronic receipt.

The electronic receipt acquiring unit 23 of the customer terminal 200 acquires the electronic receipt returned from the server 300 in response to the receipt issuing request transmitted by the receipt issuing request unit 22. The display control unit 24 displays, on a display (not shown) of the customer terminal 200, the electronic receipt acquired by the electronic receipt acquiring unit 23.

FIG. 4 is a typical diagram showing an example of the issuance requesting operation for the electronic receipt according to the first embodiment. FIG. 4 (*a*) shows an issuance requesting operation of an electronic receipt along a data flow and FIG. 4 (*b*) shows the issuance requesting operation of the electronic receipt along a time axis.

In FIG. 4(*a*), an axis of ordinate indicates a time axis, in which a time passes more greatly in a downward direction. An axis of abscissa indicates a type of an operation, in which a leftmost column indicates an example of storage of data in the receipt data storing unit 35 in the server 300, a middle column indicates an example of acquisition of a payment terminal ID through the customer terminal 200, and a rightmost column indicates an example of transmission of the receipt issuing request through the customer terminal 200. For convenience of explanation, FIG. 4 shows only data related to a payment made in the single payment terminal 100 in which the payment terminal ID is "ID-1".

As shown in a leftmost column of FIG. 4 (*a*), when a payment for a sales transaction related to a customer a is first made at 10:00 in the payment terminal 100, the payment terminal ID "ID-1", payment date and time information "10:00" representing a date and time that the payment was made and receipt data "A" representing the contents of the sales transaction are transmitted from the payment terminal 100 to the server 300 and are stored in the receipt data storing unit 35.

Next, when a payment for a sales transaction related to a subsequent customer b is made at 10:05 in the same payment terminal 100, the payment terminal ID "ID-1", payment date and time information "10:05" representing a date and time that the payment was made and receipt data "B" representing the contents of the sales transaction are transmitted from the payment terminal 100 to the server 300 and are stored in the receipt data storing unit 35.

Furthermore, when a payment for a sales transaction related to a subsequent customer c is made at 10:09 in the same payment terminal 100, the payment terminal ID "ID-1", payment date and time information "10:09" representing a date and time that the payment was made and receipt data "C" representing the contents of the sales transaction are transmitted from the payment terminal 100 to the server 300 and are stored in the receipt data storing unit 35.

As shown in the middle column in FIG. 4(*a*), the payment terminal ID "ID-1" of the payment terminal 100 is acquired by the customer terminal 200 for the customer a by reading a two-dimensional code 401 printed on the receipt 400 issued to the customer a between the completion of payment for the customer a and the completion of payment for the subsequent customer b (between 10:00 and 10:05). In the example of FIG. 4, the payment terminal ID is acquired at 10:01 between the receipt requesting customer payment date and time (10:00) for the customer a and the subsequent customer payment date and time (10:05) for the subsequent customer b.

As shown in a rightmost column in FIG. 4(*a*), furthermore, a receipt issuing request including a payment terminal ID "ID-1" acquired by the customer terminal 200 for the customer a, the ID acquisition date and time information "10:01" representing an acquisition date and time of the payment terminal ID, and a customer terminal ID "IP-a" of the customer terminal 200 for the customer a is automatically transmitted from the customer terminal 200 for the customer a to the server 300 at 10:01 which is the same time as the ID acquisition date and time.

In this case, the ID acquisition date and time "10:01" indicated by the ID acquisition date and time information included in the receipt issuing request is later than the receipt requesting customer payment date and time "10:00" for the customer a transmitting the receipt issuing request and is earlier than the subsequent customer payment date and time "10:05" for the subsequent customer b. Accordingly, the receipt data extracting unit 33 extracts, from the receipt data storing unit 35, receipt data "A" corresponding to the receipt requesting customer payment date and time that the payment was made before the ID acquisition date and time. Then, the electronic receipt issuing unit 34 issues an electronic receipt for the receipt data "A" to the customer terminal 200 for the customer a indicated by the customer terminal ID "IP-a".

When a receipt issuing request is transmitted from the customer terminal 200 to the server 300 (that is, the ID acquisition date and time "10:01"), the receipt data storing unit 35 of the server 300 stores payment date and time information representing the receipt requesting customer date and time "10:00" for the customer a but not yet payment date and time information representing the subsequent customer payment date and time "10:05" for the subsequent customer b. If the newest payment date and time information stored in the receipt data storing unit 35 is the date and time "10:00" which is earlier than the ID acquisition date and time "10:01" and payment date and time information representing a subsequent date and time is not yet stored in the receipt data storing unit 35, however, it is possible to determine that the ID acquisition date and time "10:01" is a date and time between the receipt requesting customer payment date and time "10:00" and the subsequent customer payment date and time (which is unknown at a time of the ID acquisition).

As shown in the middle column of FIG. 4(*a*), moreover, the payment terminal ID "ID-1" of the payment terminal 100 is acquired by the customer terminal 200 for the customer b by reading the two-dimensional code 401 printed on the receipt 400 in payment by the customer b between the completion of payment for the customer b and the completion of payment for the subsequent customer c (between 10:05 and 10:09). In the example of FIG. 4, the payment terminal ID is acquired at 10:07 between the payment completion date and time for the customer b (10:05) and the payment completion date and time for the subsequent customer c (10:09).

As shown in the rightmost column in FIG. 4(*a*), furthermore, a receipt issuing request including a payment terminal ID "ID-1" acquired by the customer terminal 200 for the customer b, the ID acquisition date and time information "10:07" representing the acquisition date and time of the payment terminal ID, and a customer terminal ID "IP-b" of the customer terminal 200 for the customer b is automatically transmitted from the customer terminal 200 for the customer b to the server 300 at 10:07 which is the same time as the ID acquisition date and time.

In this case, the ID acquisition date and time "10:07" indicated by the ID acquisition date and time information included in the receipt issuing request is later than the receipt requesting customer payment date and time "10:05" for the customer b transmitting the receipt issuing request and is earlier than the subsequent customer payment date and time "10:09" for the subsequent customer c. Accordingly, the receipt data extracting unit 33 extracts, from receipt data storing unit 35, receipt data "B" corresponding to the receipt requesting customer payment date and time earlier than the ID acquisition date and time. Then, the electronic receipt issuing unit 34 issues an electronic receipt for the receipt data "B" to the customer terminal 200 for the customer b indicated by the customer terminal ID "IP-b".

FIG. 5 is a typical diagram showing another example of the issuing request operation for electronic receipt according to the first embodiment. In the example of FIG. 5, an example of storage of data in the receipt data storing unit 35 in the server 300 (see FIG. 5(*a*)) is the same as that in FIG. 4(*a*).

In the example of FIG. 5, after the payment for the sales transaction related to the customer a is made at 10:00 by the payment terminal 100, the payment terminal ID is not acquired by the customer terminal 200 for the customer a but the payment for the sales transaction related to the subsequent customer b is made at 10:05. Between the time "10:05" when the payment for the customer b is completed and the time "10:09" when the payment for the subsequent customer c is completed, the payment terminal ID "ID-1" of the payment terminal 100 is acquired by the customer terminal 200 for the customer b at 10:07 and a receipt issuing request is transmitted from the customer terminal 200 for the customer b to the server 300.

In this case, the ID acquisition date and time "10:07" indicated by the ID acquisition date and time information included in the receipt issuing request given from the customer b is later than the receipt requesting customer payment date and time "10:05" for the customer b and is earlier than a subsequent customer payment date and time "10:09" for the subsequent customer c. Also in this case, accordingly, receipt data "B" corresponding to the receipt requesting customer payment date and time for the customer b is extracted from the receipt data storing unit 35 and an electronic receipt of the receipt data "B" can be issued to the customer terminal 200 for the customer b.

Referring to the receipt data "A" related to the sales transaction for the customer a, the payment terminal ID is not acquired within a time between the receipt requesting customer payment date and time "10:00" for the customer a and the subsequent customer payment date and time "10:05" for the subsequent customer b. Accordingly, the receipt data extracting unit 33 does not extract the receipt data "A" and the electronic receipt issuing unit 34 does not issue the electronic receipt of the receipt data "A".

As described above in detail, according to the first embodiment, it is possible to specify receipt data for a customer giving a receipt issuing request from among the receipt data stored in the receipt data storing unit 35, thereby issuing an electronic receipt to the customer, based on a combination of the payment terminal ID and the payment date and time information transmitted from the payment terminal 100 in payment for a sales transaction and registered in the server 300 together with the receipt data and a combination of the payment terminal ID (acquired by reading the two-dimensional code 401 of the receipt 400 printed in payment) and the ID acquisition date and time information included in the receipt issuing request transmitted from the customer terminal 200 to the server 300.

In other words, if it is determined by the payment date and time information and the ID acquisition date and time information that the payment terminal ID is acquired by the customer terminal 200 within a time between the completion of payment for the sales transaction of a certain customer and the completion of payment for a subsequent customer, receipt data relevant to the payment made at the date and time indicated by the payment date and time information can be specified as the data for the customer who has acquired the payment terminal ID, and the specified data can be issued in the form of an electronic receipt. Herein, the payment terminal ID, the payment date and time information and the ID acquisition date and time information used for specifying the receipt data for each customer are not the personal information of the customer. Even if the personal information of the customer is not previously registered in the server, accordingly, it is possible to issue the electronic receipt to the customer.

According to the first embodiment, moreover, it is not necessary to acquire the payment terminal ID by the customer terminal 200 before or during making payment for the sales transaction in the payment terminal 100. In other words, it is only necessary to acquire the payment terminal ID within a predetermined time after the payment for the sales transaction is completed in the payment terminal 100, and include the acquired payment terminal ID in the receipt issuing request for transmission to the server. More specifically, it is only necessary to read the two-dimensional code 401 on the receipt 400 printed in payment by the customer terminal 200 within a predetermined time from the time of payment completion. For this reason, it is possible to issue the electronic receipt to the customer without executing a special operation when the customer makes payment for the sales transaction in the payment terminal 100.

Although the description has been given by taking the time from the completion of payment to the completion of subsequent payment as an example of the predetermined time taken from the completion of payment in the payment terminal 100 to the acquisition of the payment terminal ID by the customer terminal 200 in the first embodiment, the present invention is not restricted thereto. For the predetermined time, it is also possible to preset a time expected to be taken averagely or at a maximum when a single customer makes payment for the sales transaction in the register terminal 101, for example.

Although the description has been given to the example in which the receipt issuing request including the payment terminal ID and the ID acquisition date and time information is automatically transmitted when the payment terminal ID is acquired by reading the two-dimensional code 401 by the customer terminal 200 in the first embodiment, moreover, the present invention is not restricted thereto. For example, as shown in FIG. 6, it is also possible to read the payment terminal ID and the ID acquisition date and time information which are stored in the storing unit 25, thereby transmitting the receipt issuing request when the customer operates the receipt issuance requesting button displayed on the display of the customer terminal 200 in an optional timing after the payment terminal ID acquiring unit 21 acquires the payment terminal ID.

Figure 6:
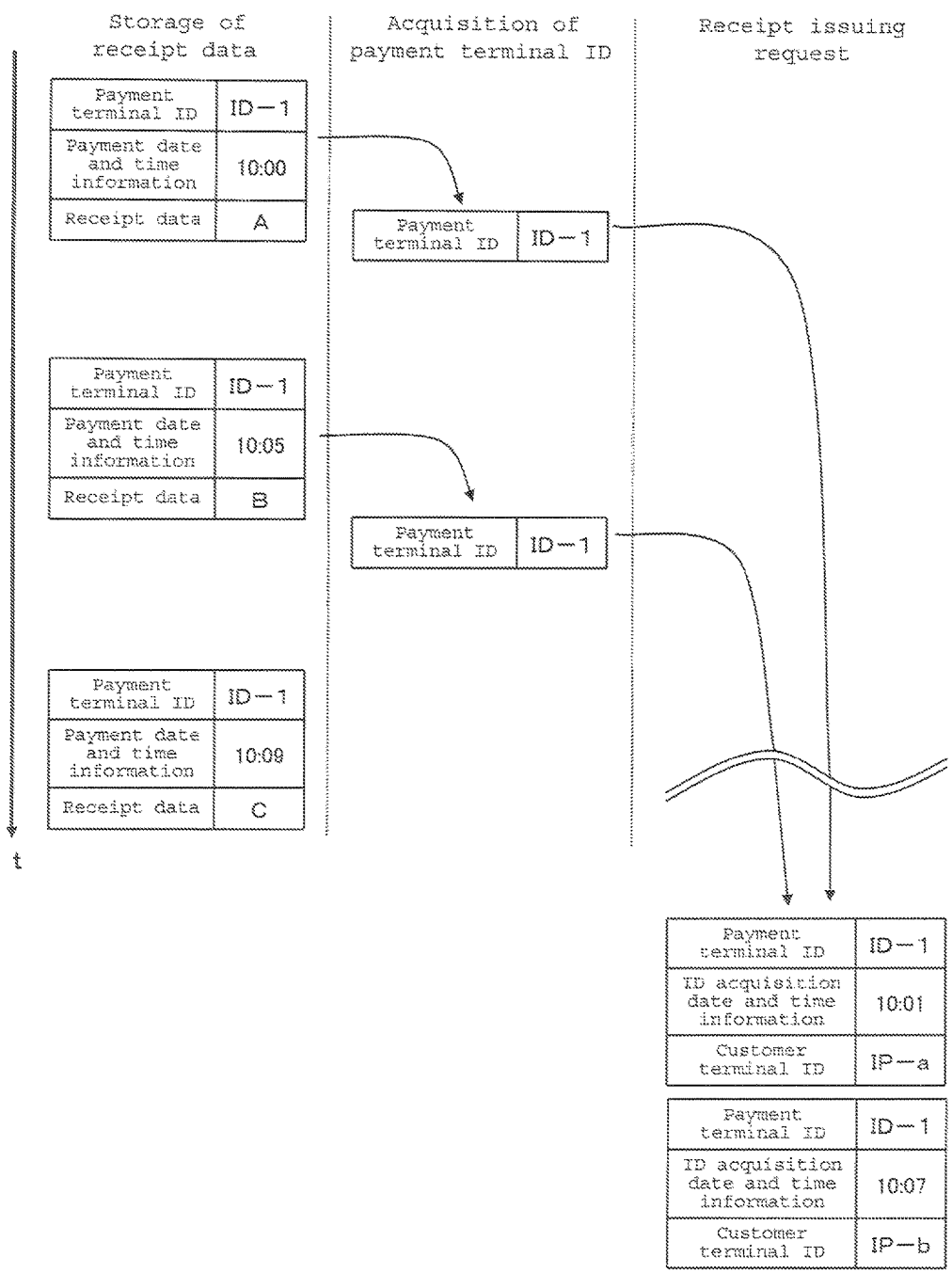
FIG. 6 is a typical diagram showing yet another example of the issuing request operation for the electronic receipt according to the first embodiment.

Also in the case in which the receipt issuing request is transmitted to the server 300 in the optional timing after the acquisition of the payment terminal ID by the customer terminal 200 as shown in FIG. 6, if it is determined by the payment date and time information and the ID acquisition date and time information that the payment terminal ID is acquired within the time between the completion of payment for the sales transaction of a certain customer and the completion of payment of a subsequent customer, receipt data relevant to the payment made at the date and time indicated by the payment date and time information can be specified as the data for the customer who has acquired the payment terminal ID and the specified data can be issued in the form of an electronic receipt.

In other words, also in the case in which the payment for the sales transaction related to the customer a is completed at 10:00, the payment terminal ID is acquired by the customer terminal 200 at 10:01, and the receipt issuing request is then transmitted from the customer terminal 200 for the customer a to the server 300 in an optional timing, the ID acquisition date and time "10:01" indicated by the ID acquisition date and time information included in the receipt issuing request from the customer a is later than the receipt requesting customer payment date and time "10:00" in the receipt data storing unit 35 stored in payment by the customer a and is earlier than the subsequent customer payment date and time "10:05" in the receipt data storing unit 35 stored in payment by the subsequent customer b. Also in this case, accordingly, the receipt data "A" corresponding to the receipt requesting customer payment date and time for the customer a can be extracted from the receipt data storing unit 35 and the electronic receipt of the receipt data "A" can be issued to the customer terminal 200 for the customer a.

Also in the case in which the payment for the sales transaction related to the customer b is completed at 10:05, the payment terminal ID is acquired by the customer terminal 200 at 10:07, and the receipt issuing request is then transmitted from the customer terminal 200 for the customer b to the server 300 in an optional timing, similarly, the ID acquisition date and time "10:07" indicated by the ID acquisition date and time information included in the receipt issuing request from the customer b is later than the receipt requesting customer payment date and time "10:05" in the receipt data storing unit 35 stored in payment by the customer b and is earlier than the subsequent customer payment date and time "10:09" in the receipt data storing unit 35 stored in payment by the subsequent customer c. Also in this case, accordingly, the receipt data "B" corresponding to the receipt requesting customer payment date and time for the customer b can be extracted from the receipt data storing unit 35 and the electronic receipt of the receipt data "B" can be issued to the customer terminal 200 for the customer b.

(Second Embodiment)

Figure 7:
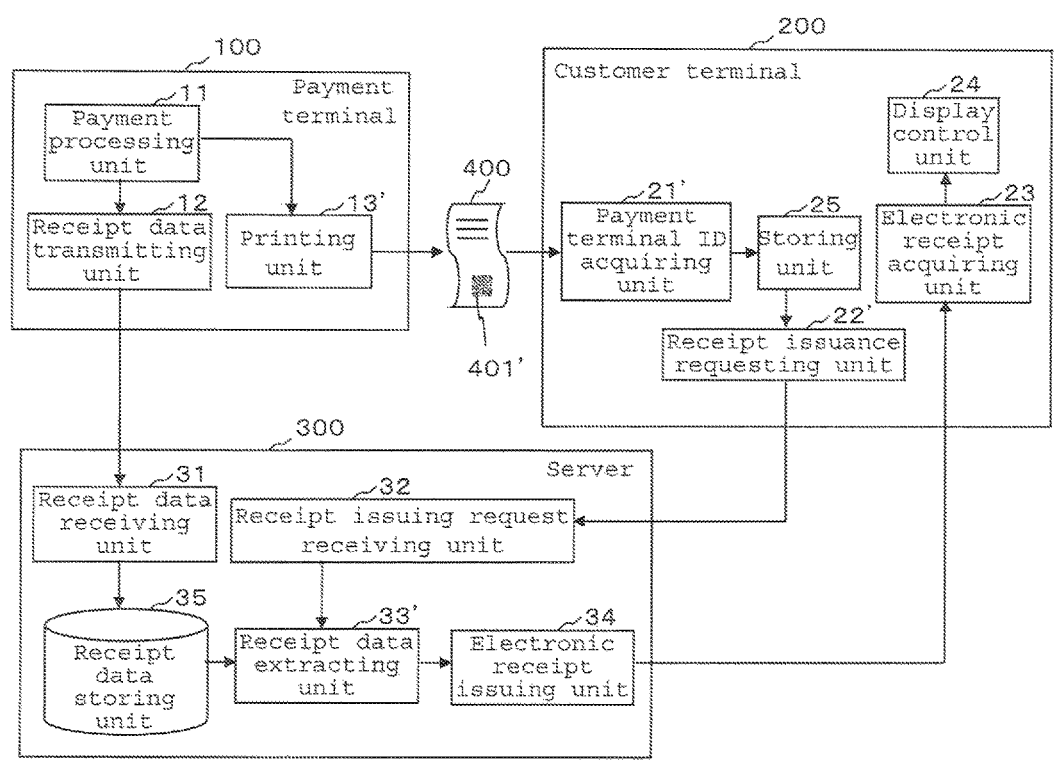
FIG. 7 is a block diagram showing an example of functional structures of a payment terminal, a customer terminal and a server according to a second embodiment.

Next, a second embodiment according to the present invention will be described based on the drawings. A whole structure of an electronic receipt issuing system according to the second embodiment is the same as in the block diagram of FIG. 1. FIG. 7 is a block diagram showing an example of functional structures of the payment terminal 100, the customer terminal 200 and the server 300 according to the second embodiment. In the second embodiment, a printing unit 13', a payment terminal ID acquiring unit 21', a receipt issuance requesting unit 22' and a receipt data extracting unit 33' are provided in place of the printing unit 13, the payment terminal ID acquiring unit 21, the receipt issuance requesting unit 22 and the receipt data extracting unit 33 shown in FIG. 2.

When the payment for the sales transaction is completed by the payment processing unit 11, the printing portion 13' prints the detailed information related to the sales transaction and the two-dimensional code 401' on the receipt 400 which is a paper medium. At this time, the printing unit 13' prints, on the receipt 400, the two-dimensional code 401' having the payment terminal ID and the payment date and time information encoded therein.

After the payment for the sales transaction is completed in the payment terminal 100, the payment terminal ID acquiring unit 21' acquires payment date and time information in addition to the payment terminal ID. More specifically, the payment terminal ID acquiring unit 21' reads the two-dimensional code 401' on the receipt 400 printed by the printing unit 13' through photographing using the camera of the customer terminal 200, thereby acquiring the payment terminal ID and the payment date and time information. The payment terminal ID and the payment date and time information thus acquired are associated with the ID acquisition date and time information and are stored in the storing unit 25.

The receipt issuance requesting unit 22' transmits, to the server 300, a receipt issuing request including the payment terminal ID and the payment date and time information acquired by the payment terminal ID acquiring unit 21' and temporarily stored in the storing unit 25, the ID acquisition date and time information stored in association with the payment terminal ID and the payment date and time information, and a customer terminal ID capable of specifying an address of the customer terminal 200. The receipt issuing request may be transmitted when the payment terminal ID acquiring unit 21' acquires the payment terminal ID and the payment date and time information or in the following optional timing.

When receiving the receipt issuing request transmitted from the receipt issuance requesting unit 22' by the receipt issuing request receiving unit 32, the receipt data extracting unit 33' extracts, from among the receipt data stored in the receipt data storing unit 35, receipt data whose payment terminal ID is coincident with the payment terminal ID included in the receipt issuing request and whose payment terminal ID is determined to be acquired within a time between the payment completion date and time represented by the payment date and time information included in the receipt issuing request and the payment completion date and time of a subsequent payment based on the ID acquisition date and time information included in the receipt issuing request.

In the case in which the receipt issuance requesting unit 22' automatically transmits the receipt issuing request to the server 300 when the payment terminal ID acquiring unit 21' acquires the payment terminal ID and the payment date and time information, the payment date and time information representing the receipt requesting customer payment date and time is stored in the receipt data storing unit 35 of the server 300 but the payment date and time information representing the subsequent customer payment date and time is not yet at a time that the receipt issuing request receiving unit 32 receives the receipt issuing request. If the newest payment date and time information stored in the receipt data storing unit 35 is the same as the receipt requesting customer payment date and time included as the payment date and time information in the receipt issuing request and the payment date and time information representing a subsequent date and time is not yet stored in the receipt data storing unit 35, however, it is possible to determine that the payment terminal ID is acquired within a time from the receipt requesting customer payment date and time to the subsequent customer payment date and time.

FIG. 8 is a typical diagram showing an example of the issuance requesting operation for the electronic receipt according to the second embodiment. FIG. 8(*a*) shows an issuance requesting operation of an electronic receipt along a data flow and FIG. 8(*b*) shows the issuance requesting operation of the electronic receipt along a time axis. FIG. 8 also shows only data related to a payment made in the single payment terminal 100 in which the payment terminal ID is "ID-1".

An example of storage of data in the receipt data storing unit 35 shown in a leftmost column of FIG. 8 (*a*) is the same as that in FIG. 4(*a*). In other words, when a payment for a sales transaction related to a customer a is first made at 10:00 in the payment terminal 100, the payment terminal ID "ID-1", payment date and time information "10:00" representing a date and time that the payment was made and receipt data "A" representing the contents of the sales transaction are transmitted from the payment terminal 100 to the server 300 and are stored in the receipt data storing unit 35.

Next, when a payment for a sales transaction related to a subsequent customer b is made at 10:05 in the same payment terminal 100, the payment terminal ID "ID-1", payment date and time information "10:05" representing a date and time that the payment was made and receipt data "B" representing the contents of the sales transaction are transmitted from the payment terminal 100 to the server 300 and are stored in the receipt data storing unit 35.

Furthermore, when a payment for a sales transaction related to a subsequent customer c is made at 10:09 in the same payment terminal 100, the payment terminal ID "ID-1", payment date and time information "10:09" representing a date and time that the payment was made and receipt data "C" representing the contents of the sales transaction are transmitted from the payment terminal 100 to the server 300 and are stored in the receipt data storing unit 35.

As shown in the middle column in FIG. 8(*a*), moreover, the payment terminal ID and the payment date and time information of the payment terminal 100 are not acquired by the customer terminal 200 for the customer a within a time between the completion of the payment for the customer a and the completion of the payment for the subsequent customer b (between 10:00 and 10:05), and the payment terminal ID and the payment date and time information are acquired by the customer terminal 200 for the customer a at 10:06 after the payment completion time for the subsequent customer b passes.

As shown in a rightmost column in FIG. 8(*a*), furthermore, a receipt issuing request including ID acquisition date and time information "10:06" representing the acquisition date and time of the payment terminal ID and a customer terminal ID "IP-a" of the customer terminal 200 for the customer a in addition to the payment terminal ID "ID-1" and the payment date and time information "10:00" representing the date and time that the payment related to the customer a is made which are acquired by the customer terminal 200 for the customer a is transmitted from the customer terminal 200 for the customer a to the server 300 at 10:06 which is the same time as the ID acquisition date and time.

As shown in the middle column in FIG. 8(*a*), moreover, the payment terminal ID and the payment date and time information are acquired by the customer terminal 200 for the customer b at 10:07 within a time from the completion of payment for the customer b to the completion of payment for the subsequent customer c (between 10:05 and 10:09).

As shown in a rightmost column in FIG. 8(*a*), furthermore, a receipt issuing request including ID acquisition date and time information "10:07" representing the acquisition date and time of the payment terminal ID and a customer terminal ID "IP-b" of the customer terminal 200 for the customer b in addition to the payment terminal ID "ID-1" and the payment date and time information "10:07" representing the date and time that the payment related to the customer b is made which are acquired by the customer terminal 200 for the customer b is transmitted from the customer terminal 200 for the customer b to the server 300 at 10:07, which is the same time as the ID acquisition date and time.

As described above, in the example of FIG. 8, the payment terminal ID and the payment date and time information are acquired by the customer terminal 200 for the customer a and the customer terminal 200 for the customer b respectively between the date and time "10:05" that the payment for the customer b is made and the date and time "10:09" that the payment related to the subsequent customer c is made, and a receipt issuing request is transmitted from the respective customer terminals 200 to the server 300.

Herein, the ID acquisition date and time "10:06" represented by the ID acquisition date and time information included in the receipt issuing request transmitted from the customer terminal 200 for the customer a does not indicate that the payment terminal ID is acquired within a time from the receipt requesting customer payment date and time "10:00" for the customer a represented by the payment data ant time information included in the receipt issuing request to the subsequent customer payment date and time "10:05" represented by the payment date and time information stored in the receipt data storing unit 35. Accordingly, the receipt data extracting unit 33' does not extract the receipt data "A" corresponding to the receipt requesting customer payment date and time and the electronic receipt issuing unit 34 does not issue the electronic receipt of the receipt data "A" to the customer terminal 200 for the customer a.

Moreover, the payment date and time information of the receipt requesting customer payment date and time "10:00" is included in the receipt issuing request transmitted from the customer terminal 200 for the customer a. Even if the customer a gives a receipt issuing request at the ID acquisition date and time "10:06", therefore, the electronic receipt for the receipt data "B" which can be issued at that time is not issued to the customer a.

On the other hand, the ID acquisition date and time "10:07" represented by the ID acquisition date and time information included in the receipt issuing request transmitted from the customer terminal 200 for the customer b indicates that the payment terminal ID is acquired within a time from the receipt requesting customer payment date and time "10:05" for the customer b represented by the payment date and time information included in the receipt issuing request to the subsequent payment completion date and time "10:09". In other words, at the time of the ID acquisition date and time "10:07", the newest payment date and time information "10:05" stored in the receipt data storing unit 35 is the same as the receipt requesting customer payment date and time "10:05" included as the payment date and time information in the receipt issuing request, and payment date and time information representing a subsequent date and time is not yet stored in the receipt data storing unit 35. For this reason, it is possible to determine that the payment terminal ID is acquired within a time from the receipt requesting customer payment date and time "10:05" to the subsequent customer payment date and time (which is unknown at a time of the ID acquisition). Accordingly, the receipt data extracting unit 33' extracts from the receipt data storing unit 35 the receipt data "B" corresponding to the receipt requesting customer payment date and time, and the electronic receipt issuing unit 34 issues the electronic receipt of the receipt data "B" to the customer terminal 200 for the customer b.

According to the second embodiment, also in the case in which a certain customer fails to acquire the payment terminal ID within the predetermined time and the payment terminal ID is acquired by a plurality of customer terminals 200 between the time from the completion of payment by the subsequent customer and the completion of payment by the customer following the subsequent customer, it is possible to specify, from among the receipt data stored in the receipt data storing unit 35, the receipt data for the customer timely acquiring the payment terminal ID within the predetermined time based on a combination of the payment terminal ID and the payment date and time information which are transmitted from the payment terminal 100 and registered in the server 300 together with the receipt data and a combination of the payment date and time information, the payment terminal ID (both of them are acquired by reading the two-dimensional code 401' of the receipt 400 printed at a time of payment), and the ID acquisition date and time information which are included in the receipt issuing request transmitted from the customer terminal 200 to the server 300, thereby issuing the electronic receipt to the customer.

When the ID acquisition date and time information is not included in the receipt issuing request and only the payment date and time information and the payment terminal ID are included, it is possible to specify the receipt data. However, in the case in which the payment date and time information and the payment terminal ID are printed on the receipt 400 and the customer discards the receipt 400, somebody can acquire the electronic receipt by picking up the receipt 400 and giving access to the server 300 based on the information described therein. On the other hand, according to the second embodiment, the electronic receipt can be acquired only when the payment terminal ID is acquired until a subsequent sales transaction is completed. Therefore, it is possible to prevent the defect described above.

In the first embodiment, the payment date and time information is not included in the receipt issuing request and the predetermined time from the payment completion to the subsequent payment completion is specified based on only the payment date and time information stored in the receipt data storing unit 35. For this reason, in the case shown in FIG. 8, the electronic receipt of the receipt data "B" is issued in response to the receipt issuing request given from the customer a and the receipt issuing request given from the customer b. Therefore, it is preferable to give, as an operation of a store, a guide bulletin for urging a person wanting the issuance of the electronic receipt to acquire the payment terminal ID immediately after the completion of the payment, thereby devising to prevent the acquisition of the payment terminal ID beyond the subsequent customer payment date and time as shown in FIG. 8.

Figure 9:
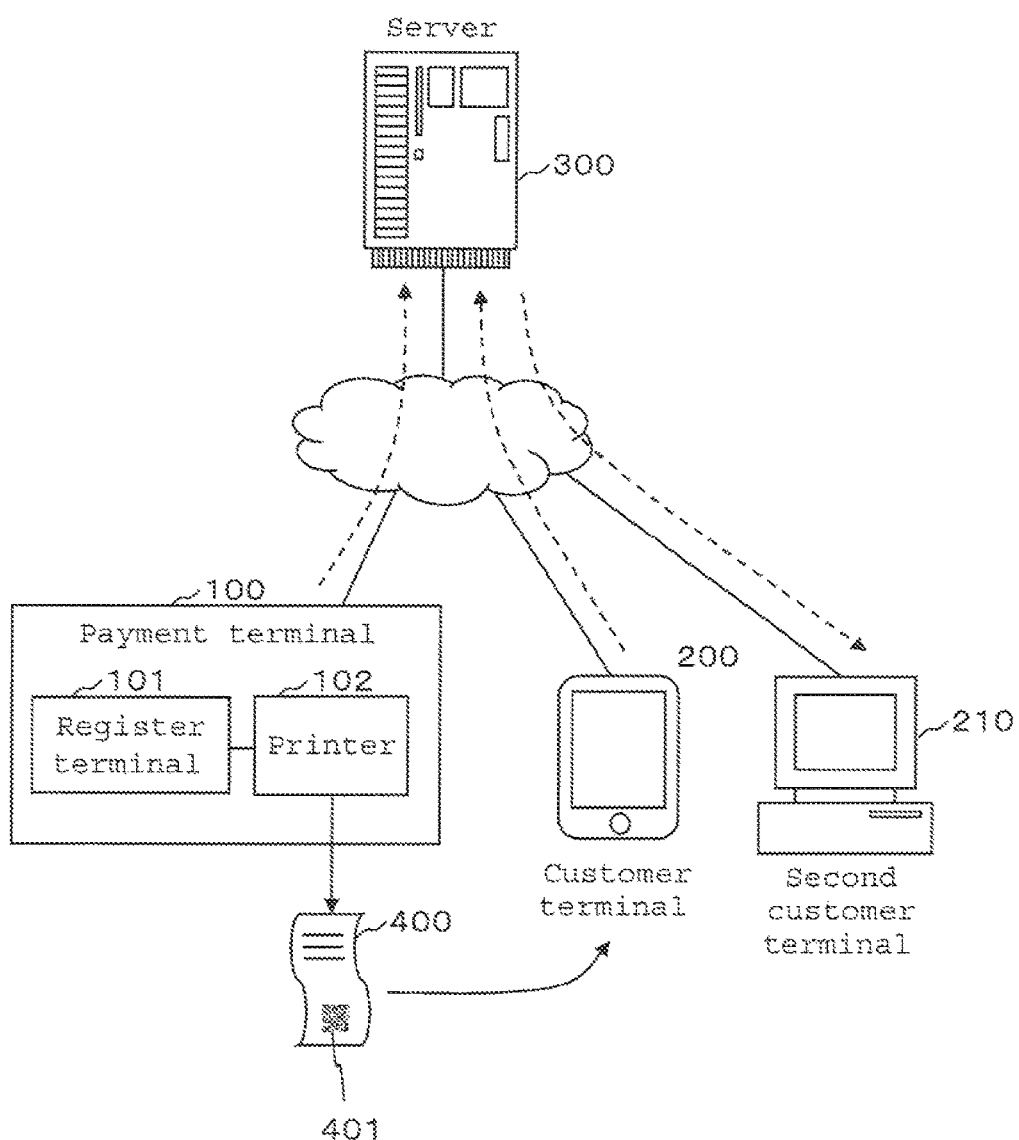
FIG. 9 is a block diagram showing a variant of an electronic receipt issuing system.

Although the description has been given to the example in which the electronic receipt is issued to the customer terminal 200 transmitting the receipt issuing request in the first and second embodiments, the present invention is not restricted thereto. For example, as shown in FIG. 9, the electronic receipt may be issued to the second customer terminal 210 designated by the customer.

In this case, the receipt issuance requesting unit 22 in FIG. 2 or the receipt issuance requesting unit 22' in FIG. 7 transmits, to the server 300, a receipt issuing request further including distribution destination information (address information such as an IP address or a mail address) indicative of a distribution destination designated by a customer. The customer operates the customer terminal 200, thereby presetting the distribution destination information to the receipt issuance requesting units 22 and 22', for example. The electronic receipt issuing unit 34 of the server 300 issues an electronic receipt to the second customer terminal 210 corresponding to the distribution destination indicated by the receipt issuing request.

Although the description has been given to the example in which the two-dimensional codes 401 and 401' printed on the receipt 400 are read to acquire the payment terminal ID and the payment date and time information which are coded as the two-dimensional codes 401 and 401' in the first and second embodiments, moreover, the present invention is not restricted thereto. For example, the payment terminal 100 may include short-range radio communication means such as an NFC (Near field communication) or a BLE (Bluetooth Low Energy: Bluetooth is the registered trademark), and the client terminal 200 may acquire the payment terminal ID and the payment date and time information from the payment terminal 100 by radio communication.

Figure 10:
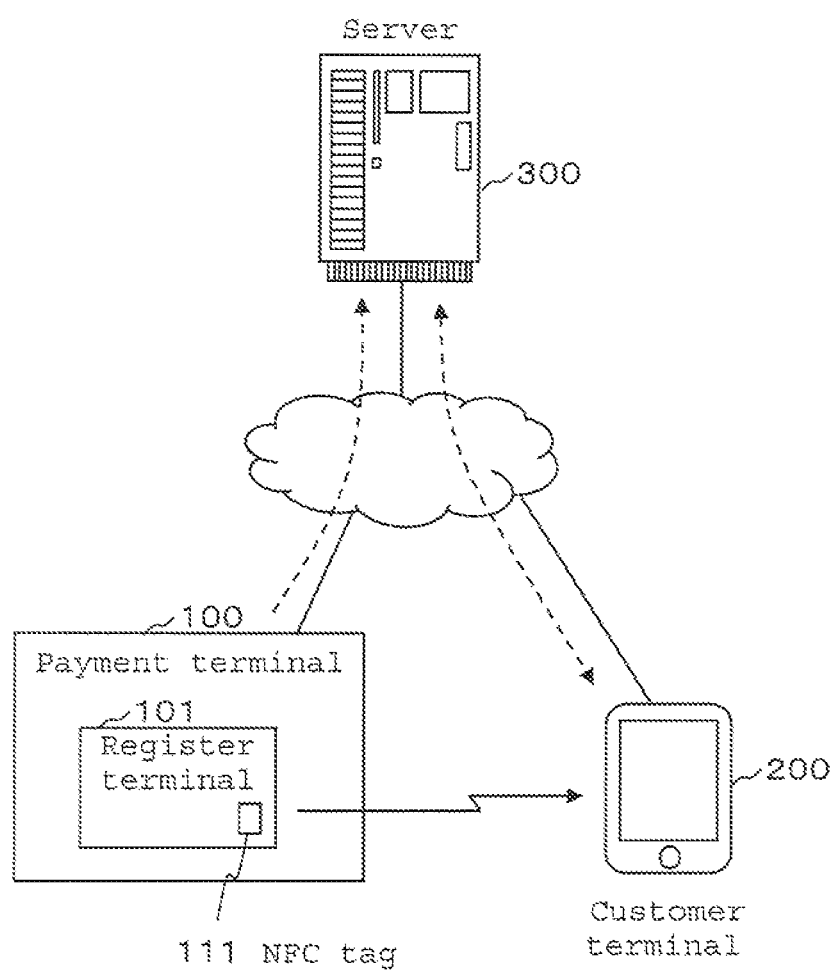
FIG. 10 is a block diagram showing an example of a whole structure of the electronic receipt issuing system in the case in which an NFC is used.

FIG. 10 is a block diagram showing an example of a whole structure of an electronic receipt issuing system in the case in which the NFC is used as an example of the short-range radio communication means. Moreover, FIG. 11 is a block diagram showing an example of functions structures of the payment terminal 100, the customer terminal 200 and the server 300 in the case in which the NFC is used as a variant of the electronic receipt issuing system according to the first embodiment.

As shown in FIG. 10, in an electronic receipt issuing system according to the present variant, the payment terminal 100 includes an NFC tag 111 in place of the printer 102. The NFC tag 111 is attached to a surface of a housing of the register terminal 101 and stores payment terminal ID in an internal memory. Although the description has been given to the example in which the printer 102 is omitted, the printer 102 may be provided to print a normal receipt. In this case, the NFC tag 111 may be attached to the surface of the housing of the printer 102.

Figure 11:
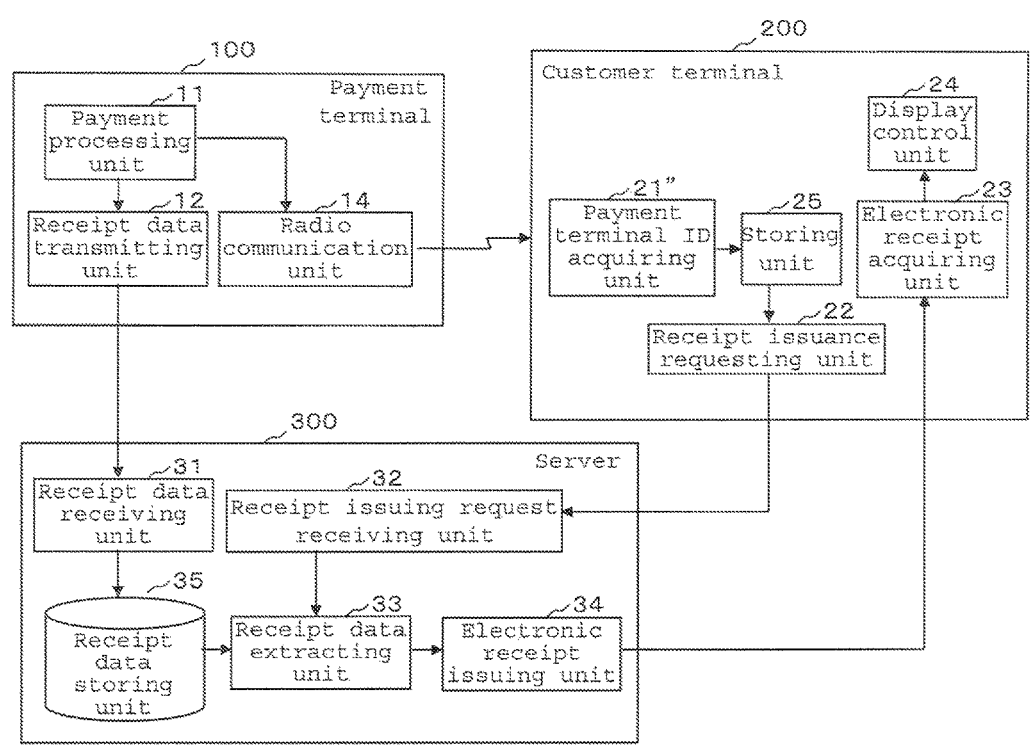
FIG. 11 is a block diagram showing an example of functional structures of a payment terminal, a customer terminal and a server in the case in which the NFC is used as a variant of the electronic receipt issuing system according to the first embodiment.

As shown in FIG. 11, the payment terminal 100 includes a radio communication unit 14 in place of the printing portion 13. The radio communication unit 14 transmits the payment terminal ID stored in the NFC tag 111 through an NFC communication. The customer terminal 200 includes a payment terminal ID acquiring unit 21" in place of the payment terminal ID acquiring unit 21. The payment terminal ID acquiring unit 21" is configured from an NEC reader and acquires the payment terminal ID transmitted through the radio communication unit 14 after the payment of for the sales transaction is completed in the payment terminal 100.

As is well known, a communication distance of the NFC is smaller than 10 centimeters. In order for the payment terminal ID acquiring unit 21" (the NFC reader) to acquire the payment terminal ID from the NFC tag 111 attached to the register terminal 101, accordingly, it is necessary to cause the customer terminal 200 to approach the NFC tag 111. In other words, by causing the customer terminal 200 to approach the NFC tag 111 of the register terminal 101 after completing the payment for the sales transaction in the payment terminal 100, the payment terminal ID acquiring unit 21" acquires the payment terminal ID from the NFC tag 111 by the NFC communication.

Figure 12:
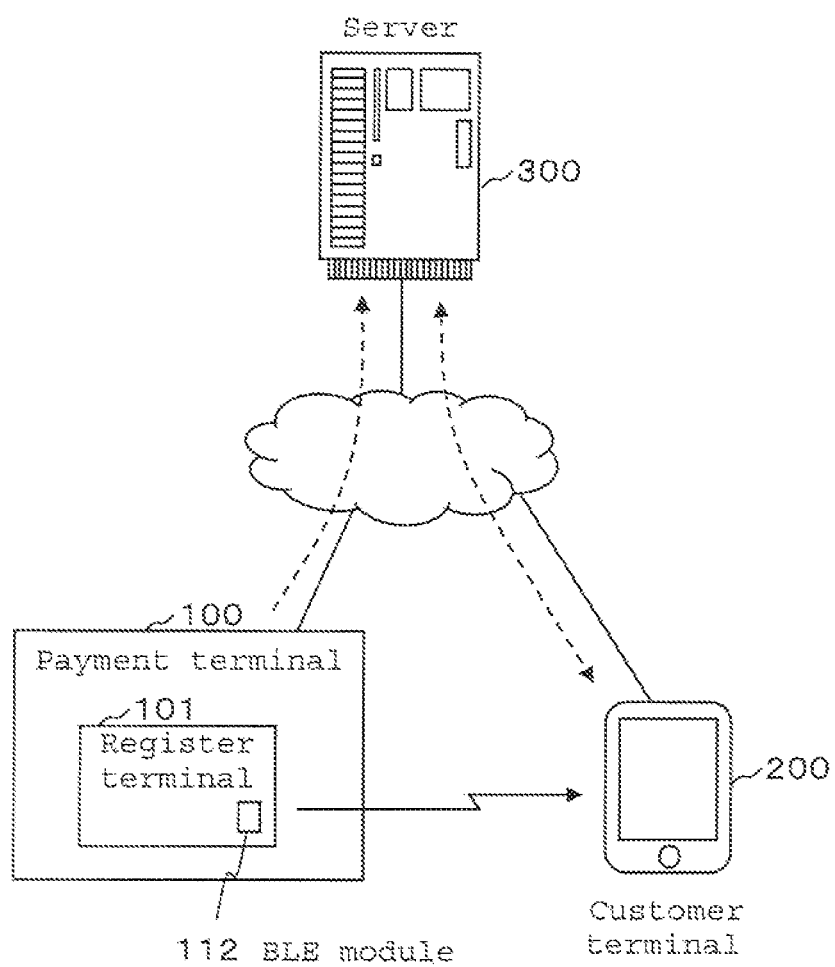
FIG. 12 is a block diagram showing an example of a whole structure of the electronic receipt issuing system in the case in which a BLE is used.

FIG. 12 is a block diagram showing another example of the whole structure of the electronic receipt issuing system in the case in which the BLE is used as an example of the short-range radio communication means. Moreover, FIG. 13 is a block diagram showing an example of the functional structures of the payment terminal 100, the customer terminal 200 and the server 300 in the case in which the BLE is used as a variant of the electronic receipt issuing system according to the first embodiment.

As shown in FIG. 12, referring to the electronic receipt issuing system according to the present variant, the payment terminal 100 includes a BLE module 112 in place of the printer 102. The BLE module 112 is attached to the surface of the housing of the register terminal 101 and stores the payment terminal ID in the internal memory. Although the description has been given to the example in which the printer 102 is omitted, the printer 102 may be provided to print a normal receipt. In this case, the BLE module 112 may be attached to the surface of the housing of the printer 102. The BLE module 112 can also be attached as a BLE dongle to be connected to an external interface unit of the register terminal 101 or the printer 102. Alternatively, the BLE module 112 can also be mounted on an internal substrate in the register terminal 101 or the printer 102.

Figure 13:
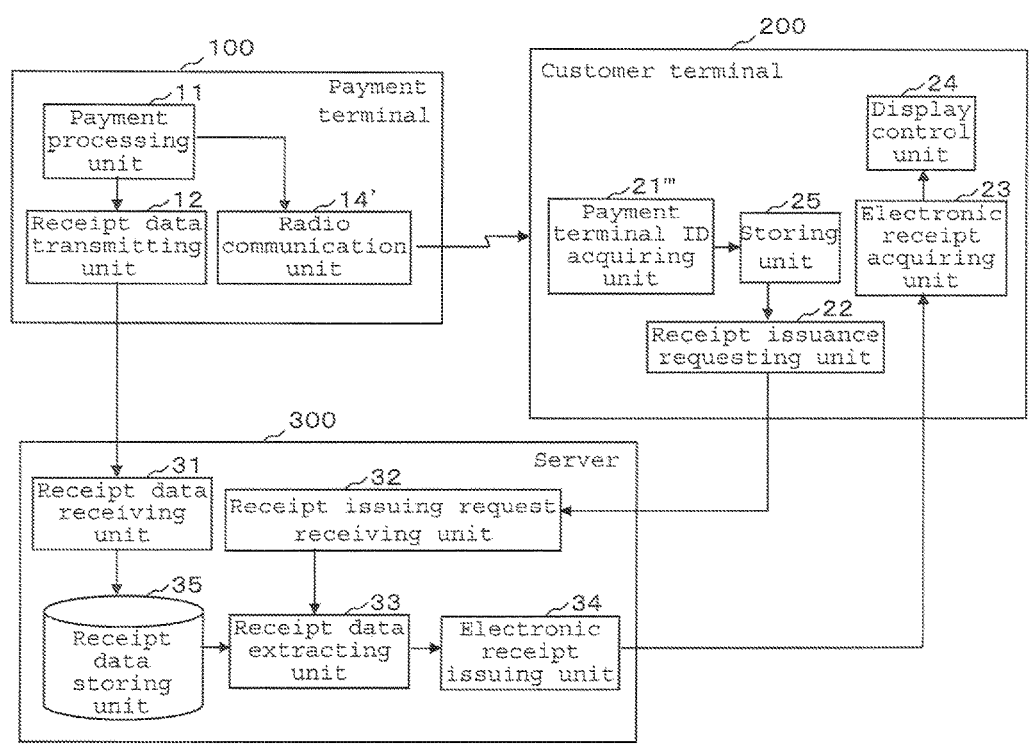
FIG. 13 is a block diagram showing an example of functional structures of a payment terminal, a customer terminal and a server in the case in which the BLE is used as a variant of the electronic receipt issuing system according to the first embodiment.

As shown in FIG. 13, the payment terminal 100 includes a radio communication unit 14' in place of the printing unit 13. The radio communication unit 14' transmits, by a BLE communication, the payment terminal ID (for example, an MAC address of the BLE module 112) stored in the BLE module 112. The BLE module 112 repetitively transmits the payment terminal ID at a certain time interval.

The customer terminal 200 includes a payment terminal ID acquiring unit 21''' in place of the payment terminal ID acquiring unit 21. The payment terminal ID acquiring unit 21''' is configured from a BLE receiving device and acquires the payment terminal ID transmitted by the radio communication unit 14' after the payment for the sales transaction is completed in the payment terminal 100.

As is well known, a communication distance of the BLE is several meters. Accordingly, it is necessary to prevent the payment terminal ID from being received by mistake in the payment terminal 200 possessed by someone else in proximity other than the customer making the payment. For example, it is possible to devise that the payment terminal ID acquiring unit 21''' is configured to acquire the payment terminal ID when detecting that the customer terminal 200 is swung in a predetermined direction by means an acceleration sensor provided in the customer terminal 200 or the like. In other words, the payment terminal ID acquiring unit 21''' acquires the payment terminal ID transmitted by the radio communication unit 14' through the BLE communication when detecting that the customer terminal 200 is swung in a predetermined direction after completing the payment for the sales transaction in the payment terminal 100.

FIGS. 11 and 13 show the structure according to the variant of the electronic receipt issuing system in accordance with the first embodiment. However, the same deformation can also be applied as a variant of the electronic receipt issuing system according to the second embodiment. For example, in the case in which the NFC is used as a variant of the electronic receipt issuing system according to the second embodiment, the radio communication unit 14 in FIG. 11 transmits the payment date and time information by the NFC communication in addition to the payment terminal ID stored in the NFC tag 111. Then, the payment terminal ID acquiring unit 21'' acquires the payment terminal ID and the payment date and time information which are transmitted by the radio communication unit 14 after the payment for the sales transaction is completed in the payment terminal 100.

In the case in which the BLE is used as the valiant of the electronic receipt issuing system according to the second embodiment, moreover, the radio communication unit 14' in FIG. 13 transmits the payment date and time information through the BLE communication in addition to the payment terminal ID stored in the BLE module 112. Then, the payment terminal ID acquiring unit 21''' acquires the payment terminal ID and the payment date and time information which are transmitted by the radio communication unit 14' after the payment for the sales transaction is completed in the payment terminal 100.

Although the description has been given to the example in which the receipt data is configured from image data in the first and second embodiments, moreover, the present invention is not restricted thereto. For example, the receipt data may be configured from data in another format such as text data, CSV data or journal data. In this case, the electronic receipt issuing unit 34 generates and issues an electronic receipt through an image based on the receipt data extracted by the receipt data extracting units 33 and 33'. Alternatively, the electronic receipt to be issued is not restricted to an image but any format which can be displayed may be used. For example, it is also possible to issue the electronic receipt in an electronic document format, a PDF (Portable Document Format) or the like.

Although the description has been given to the example in which the ID acquisition date and time is specified by the timing function possessed by the customer terminal 200 in the first and second embodiment, moreover, the present invention is not restricted thereto. For example, the date and time acquired by the customer terminal 200 from the payment terminal 100 may be used as the ID acquisition date and time information. In the case in which the acquisition of the payment terminal ID and the receipt issuing request are carried out at the same time, moreover, the date and time information timed by the server 300 when the receipt issuing request is transmitted to the server 300 may be used as the ID acquisition date and time information.

In addition, the first and second embodiments are only illustrative for concreteness to carry out the present invention and the technical scope of the present invention should not be thereby construed to be restrictive. In other words, the present invention can be carried out in various configurations without departing from the gist or main features thereof.

EXPLANATION OF DESIGNATION 11 payment processing unit
12 receipt data transmitting unit
13 printing unit
14, 14' radio communication unit
21, 21', 21'', 21''' payment terminal ID acquiring unit
22, 22' receipt issuance requesting unit
23 electronic receipt acquiring unit
31 receipt data receiving unit
32 receipt issuance request receiving unit
33, 33' receipt data extracting unit
34 electronic receipt issuing unit
35 receipt data storing unit
100 payment terminal
101 register terminal
102 printer
200 customer terminal
210 second customer terminal
300 server
400 receipt
401, 401' two-dimensional code (code information)

The invention claimed is:

1. An electronic receipt issuing system including a payment terminal, a customer terminal and a server, wherein
the payment terminal comprising:
a receipt data transmitting unit which transmits receipt data to the server when a payment is made for a sales transaction in the payment terminal, the receipt data representing a content of the sales transaction, a payment terminal ID capable of specifying the payment terminal in which the payment is made, and payment date and time information representing a date and time that the payment is made,
the customer terminal comprising:
a payment terminal ID acquiring unit which acquires the payment terminal ID after the payment for the sales transaction is completed in the payment terminal; and
a receipt issuance requesting unit which transmits a receipt issuing request to the server, the receipt issuing request containing the payment terminal ID acquired by the payment terminal ID acquiring unit and ID acquisition date and time information representing an acquisition date and time of the payment terminal ID, and
the server comprising:
a receipt data storing unit which stores the receipt data, the payment terminal ID and the payment date and time information transmitted by the receipt data transmitting unit in association with each other;
a receipt data extracting unit which extracts receipt data associated with the payment terminal ID contained in the receipt issuing request and associated with a first payment date and time information from among the receipt data stored in the receipt data storing unit upon receipt of the receipt issuing request from the receipt issuance requesting unit on condition that the ID acquisition date and time information contained in the receipt issuing request is after the first payment date and time information among a plurality of payment date and time information stored in association with the payment terminal ID contained in the receipt issuing request and before a second payment date and time information among the plurality of payment date and time information stored in association with the payment terminal ID contained in the receipt issuing request, the second payment date and time information being immediately subsequent to the first payment date and time information; and an electronic receipt issuing unit which issues an electronic receipt based on the receipt data extracted by the receipt data extracting unit.

2. The electronic receipt issuing system according to claim 1, wherein the payment terminal ID acquiring unit acquires the payment date and time information in addition to the payment terminal ID after the payment for the sales transaction is completed in the payment terminal, the receipt issuance requesting unit transmits the receipt issuing request to the server, the receipt issuing request including the payment terminal ID, the payment date and time information and the ID acquisition date and time information, and the receipt data extracting unit extracts receipt data associated with the payment terminal ID contained in the receipt issuing request and associated with a first payment date and time information from among the receipt data stored in the receipt data storing unit upon receipt of the receipt issuing request from the receipt issuance requesting unit on condition that the ID acquisition date and time information contained in the receipt issuing request is after the first payment date and time information among a plurality of payment date and time information stored in association with the payment terminal ID contained in the receipt issuing request and before a second payment date and time information among the plurality of payment date and time information stored in association with the payment terminal ID contained in the receipt issuing request, the second payment date and time information being immediately subsequent to the first payment date and time information.

3. The electronic receipt issuing system according to claim 2, wherein the receipt issuance requesting unit transmits the receipt issuing request to the server, when the payment terminal ID acquiring unit acquires the payment terminal ID and the payment date and time information or in the following optional timing.

4. The electronic receipt issuing system according to claim 2, wherein the payment terminal further comprises a printing unit for printing, on a paper medium, code information representative of the payment terminal ID and the payment date and time information when the payment for the sales transaction is completed in the payment terminal, and the payment terminal ID acquiring unit acquires the payment terminal ID and the payment date and time information by reading the code information.

5. The electronic receipt issuing system according to claim 1, wherein the receipt issuance requesting unit transmits the receipt issuing request to the server when the payment terminal ID acquiring unit acquires the payment terminal ID or in the following optional timing.

6. The electronic receipt issuing system according to claim 1, wherein the customer terminal further comprises an electronic receipt acquiring unit for acquiring the electronic receipt returned from the server in response to the receipt issuing request transmitted by the receipt issuance requesting unit, and the electronic receipt issuing unit of the server issues the electronic receipt to the customer terminal transmitting the receipt issuing request.

7. The electronic receipt issuing system according to claim 1, wherein the receipt issuing request further includes distribution destination information indicative of a distribution destination designated by a customer, and the electronic receipt issuing unit of the server issues the electronic receipt to a second customer terminal designated by the distribution destination information included in the receipt issuing request.

8. The electronic receipt issuing system according to claim 1, wherein the payment terminal further comprises a printing unit for printing, on a paper medium, code information representative of the payment terminal ID when the payment for the sales transaction is completed in the payment terminal, and the payment terminal ID acquiring unit acquires the payment terminal ID by reading the code information.

9. The electronic receipt issuing system according to claim 1, wherein the payment terminal is provided with a register terminal and a printer, the printer being built in or connected to the register terminal, and the payment terminal ID comprises a printer ID.

10. An electronic receipt issuing system including, a customer terminal and a server, wherein the customer terminal comprising:
an optical input which scans a printed receipt from a payment terminal upon completion of payment, the printed receipt including receipt data and an encoded payment terminal ID;
a payment terminal ID acquiring unit programmed to decode the encoded payment terminal ID; and
a receipt issuance requesting unit which transmits a receipt issuing request to the server, the receipt issuing request containing the decoded payment terminal ID acquired by the payment terminal ID acquiring unit and a date and time that the customer terminal scanned the printed receipt;

the server comprising:
a receipt data storing unit which stores receipt data received from the payment terminal in association with a payment terminal ID and a payment date and time received from the payment terminal;
a receipt data extracting unit which extracts such receipt data associated with the payment terminal ID contained in the receipt issuing request and associated with a first payment date and time from among the receipt data stored in the receipt data storing unit upon receipt of the receipt issuing request on condition that the printed receipt scanning date and time contained in the receipt issuing request is after the first payment date and time among a plurality of payment date and time stored in association with the payment terminal ID contained in the receipt issuing request and before a second payment date and time among the plurality of payment date and time stored in association with the payment terminal ID contained in the receipt issuing request, the second payment date and time being immediately subsequent to the first payment date and time; and an electronic receipt issuing unit which issues an electronic receipt based on the receipt data extracted by the receipt data extracting unit.

\* \* \* \* \*